(12) United States Patent
Nagasaka et al.

(10) Patent No.: US 6,224,959 B1
(45) Date of Patent: May 1, 2001

(54) OPTICAL DISC

(75) Inventors: Kimio Nagasaka, Nirasaki; Akira Miyamae, Fujimi-machi, both of (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/380,980

(22) PCT Filed: Jan. 22, 1999

(86) PCT No.: PCT/JP99/00251
§ 371 Date: Sep. 14, 1999
§ 102(e) Date: Sep. 14, 1999

(30) Foreign Application Priority Data

Jan. 23, 1998 (JP) .................................................. 10-011562

(51) Int. Cl.$^7$ ........................................................ B32B 3/02
(52) U.S. Cl. ........................ 428/64.1; 428/64.2; 428/64.4; 428/913; 430/270.11; 430/495.1; 430/945; 369/275.3; 369/275.4; 369/277

(58) Field of Search .................................. 428/64.1, 64.2, 428/64.4, 913; 430/270.11, 495.1, 945; 369/275.1, 275.4, 277, 275.3

(56) References Cited

FOREIGN PATENT DOCUMENTS

| 1-181134 U | 12/1989 | (JP) . |
|---|---|---|
| 7-192288 | 7/1995 | (JP) . |
| 9-81965 | 3/1997 | (JP) . |

*Primary Examiner*—Elizabeth Evans
(74) *Attorney, Agent, or Firm*—Oliff & Berridge, PLC

(57) ABSTRACT

Prepits in a sector header area are arranged on center lines of groove tracks or land tracks, and header signals are played back in a drive by using sum signals of split sensors, thereby providing resistance to disc tilt or track offset and improving margins.

4 Claims, 5 Drawing Sheets

OPTICAL DISC

BACKGROUND OF THE INVENTION

1. Field of the Invention

The present invention relates to an optical disc and an optical disc stamper for manufacturing such an optical disc.

2. Description of the Related Art

As an example of the related art, explanations are hereinafter given about how address information is recorded in prepits on a DVD-RAM, a rewritable optical disc with 2.6 GB recording capacity on one side thereof, by referring to FIGS. 5, 6, and 7.

The recording side of a DVD-RAM (2.6 GB) is divided into a plurality of cocentric areas which are called bands 501. Each band has tracks formed therein spirally, and a plurality of land tracks and groove tracks are disposed alternately per round and in succession. Each track is composed of a plurality of sectors which are data recording/playback units and each sector starts at the same position circumferentially as that of adjacent track sectors within the same band. At the top of each sector, a header which indicates synchronizing signals, address information and the like in the form of arranged prepits, and header areas 500 in a long strip shape in a radial direction are observed in appearance. An enlarged view of the header areas 500 is shown in FIG. 5. Recording areas of groove tracks 600 or prepits 603, when viewed through a base of the disc, are usually convex. Recording areas of the land tracks 601 are formed adjacent to the recording areas of the groove tracks 600.

When data is recorded/played back in the DVD-RAM drive, tracking servo is applied in a manner such that an optical spot follows a groove track center line 604 or a land track center line 605, and then a recording mark is written in the recording areas 600 and 601, and the data is read. A sector header is composed of arrays of the prepits 603, which are arranged on the border lines of the land tracks and the groove tracks. The header portion is divided into an ID 1–2 area and an ID 3–4 area, and each of them is arranged on the border lines of both sides.

In detecting these prepits using the DVD-RAM drive, a beam is converged at an objective lens 701, is transmitted through a base 701a1, and is then made to focus on a recording layer 703a1, and is further caused to track on the groove track center line 604 or the land track center line 605. The quantity of light of a reflection beam 700 is detected by using two-piece sensors 704 and 705 which are divided parallel to the track center line 605 and a header playback signal 707a2 is obtained by finding a difference between the outputs from the two sensors. When the light spot is located at the edge of a prepit 706, the luminous intensity distribution in the x axis direction of the reflection beam 700 will be as shown in distribution 707a1, and the output of the two-piece sensor 704 increases and becomes the state of point 708a3 of a header playback signal 710a3. On the other hand, when the light spot is not located at the edge of the prepit, the luminous intensity distribution in the x axis direction of the reflection beam 700 will be as shown in distribution 707a2 and, therefore, the outputs of the two-piece sensors 704 and 705 become the same and become the state of point 709a3 of the header playback signal 707a3.

With this conventional prepit arrangement in the DVD-RAM header area and by this detecting method, when the disc has a tilt in its radial direction or when a track offset is caused for some reason, the reading rate of the header playback signals suddenly decreases, and a tilt margin or an off-track margin becomes narrow. The reason for this is explained by using FIG. 7.

When there is no disc tilt as shown with regard to the header playback signal 710a3, an output signal is at 0 level in the state of 709a3 if the light spot is not located at a prepit, and high signal amplitude can be obtained.

When there is a disc tilt, however, the luminous intensity distribution of a reflection beam when the light spot is located at the edge of a prepit 706b1 is as shown in distribution 707b1, the peak of luminous intensity further shifting toward a negative direction compared to the distribution 707a1 and, therefore, a differential signal of the two-piece sensors 704 and 705 becomes the state of point 708b3 of the header playback signal 710b3, and remains at a lower level than that of point 708a3. When the light spot is not located at the edge of a prepit, the peak of the luminous intensity in the luminous intensity distribution of the reflection beam also shifts to a negative direction as shown in distribution 707b2, a differential signal of the two-piece sensors 704 and 705 becomes the state of point 709b3 of the header playback signal 710b3 and does not become a 0 level. Consequently, the playback signal amplitude decreases and the SN ratio (signal-to-noise ratio) lowers, thereby lowering the reading rate of the header signal and narrowing the margin for the disc tilt.

Likewise, when a track offset occurs, the signal amplitude decreases, thereby lowering the reading rate of the header signal and narrowing the margin for the track offset.

Therefore, it is an object of the present invention to enhance the reading rate of the header signal, and to provide an optical disc which can have a sufficient margin for the disc tilt or track offset.

SUMMARY OF THE INVENTION (1) An optical disc of the present invention has substantially ring-shaped groove tracks and land tracks disposed alternately every round on the recording side thereof, and the optical disc is capable of rewriting information to both of these tracks. The optical disc is characterized in that prepits representing address information of sectors are disposed on the center lines of the groove tracks or land tracks.

(2) The optical disc of the present invention as described in paragraph (1) above is characterized in that a total length of the prepits on the groove tracks within a single sector is always longer than that on the land tracks.

(3) The optical disc of the present invention as described in paragraph (1) above is characterized in that the prepits on the groove tracks are recorded in space position modulation, and the prepits on the land tracks are recorded in pit position modulation.

(4) The optical disc of the present invention as described in paragraph (3) above is characterized in that the prepit data modulation mode is 2–7 modulation.

BEST MODE FOR CARRYING OUT THE INVENTION

Embodiment 1

An embodiment of an optical disc according to the present invention will be hereinafter explained by referring to FIGS. 1, 2, 3 and 5.

Figure 1:
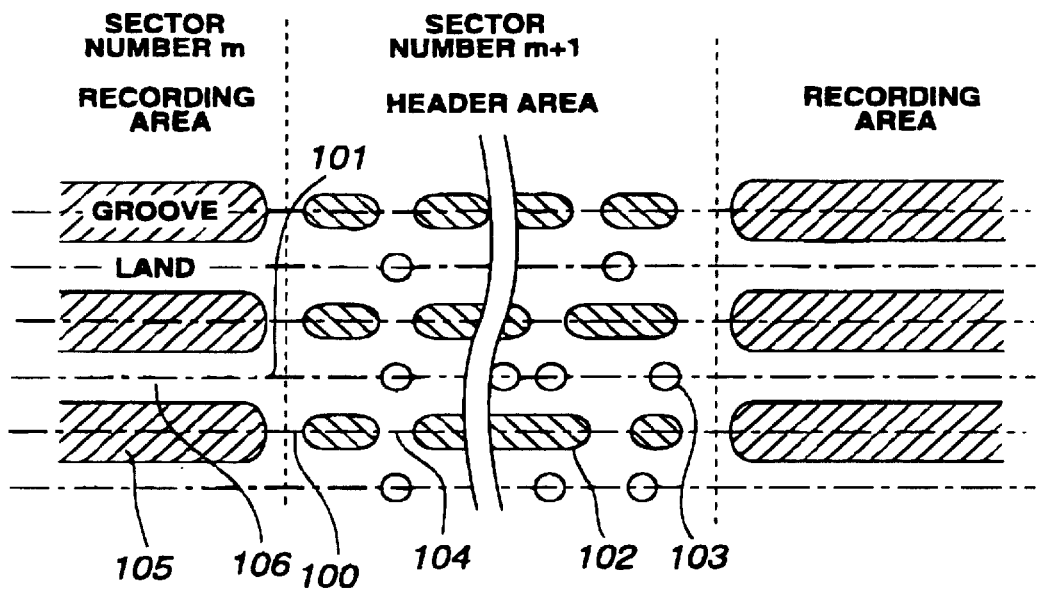
FIG. 1 is a view to explain a header area of an optical disc of Embodiment 1.

The recording side of the optical disc of the present invention is divided into a plurality of concentric areas which are called bands 501. Each band has tracks formed therein spirally, and a plurality of land tracks and groove tracks are arranged alternately per round and in succession. Each track is composed of a plurality of sectors which are data recording/playback units, and each sector starts at the same position circumferentially as that of adjacent track sectors within the same band. Each sector is structured of a header area which is composed of arrays of prepits which represent synchronizing signals and sector address information, and a recording area for users to use for recording/playback. In appearance, the header area 500 is in a long strip shape in the radial direction. An enlarged view of the header area 500 is shown in FIG. 1. Recording areas 105 of groove tracks 100 or prepits 102 and 103 are usually convex as shown with a prepit 208, as viewed through the base of this disc. The prepits 102 are disposed on the groove tracks 100, and the prepits 103 are disposed on the land tracks 101. A recording area 106 of the land track 101 is formed adjacent to the recording area 105 of the groove track 100, and it is possible to record and playback information in both areas.

An explanation is hereinafter given about how a header signal is played back by using the optical disc drive.

Firstly, a laser emitted from a semiconductor laser 201 becomes a collimated beam 203 at a collimator lens 202, reflects at a beam splitter 204, converges at an objective lens 205, and enters the optical disc. The optical disc is composed of a base 206 and a recording layer 207. The incident beam is transmitted through the base 206, and then enters the recording layer 207. At the time of recording/playback, a focus servo is applied so that the beam is brought to a focus at the recording layer 207, and a tracking servo is applied to the land track 101. When a light spot passes over the prepit 103, the shape of its cross section is convex like that of the prepit 208 as seen through the base, and the light spot reflects while being subjected to optical modulation. When there is no prepit, it reflects without being modulated. The reflected beam diffuses and is transmitted through the base 206 in the direction opposite to the incident direction, becomes a collimated beam 209 at the objective lens 205, passes through the beam splitter 204, and then enters the two-piece sensors 210 and 211. Playback signals of the prepits 102 and 103 are obtained with an adder 213 for adding the outputs of the respective two-piece sensors 210 and 211. A tracking error signal used for the tracking servo is obtained with a subtracter 212 for subtracting the outputs of the respective two-piece sensors 210 and 211.

Figure 3A:
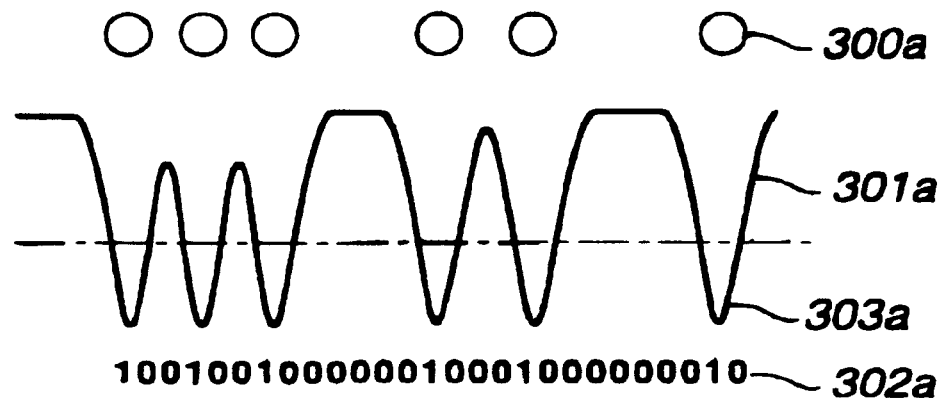
FIG. 3 is a view to explain the relationship between the array pattern of prepits in the header area of the optical disc of Embodiment 1 and playback signals at the time of playback on the optical disc drive.
Figure 3B:
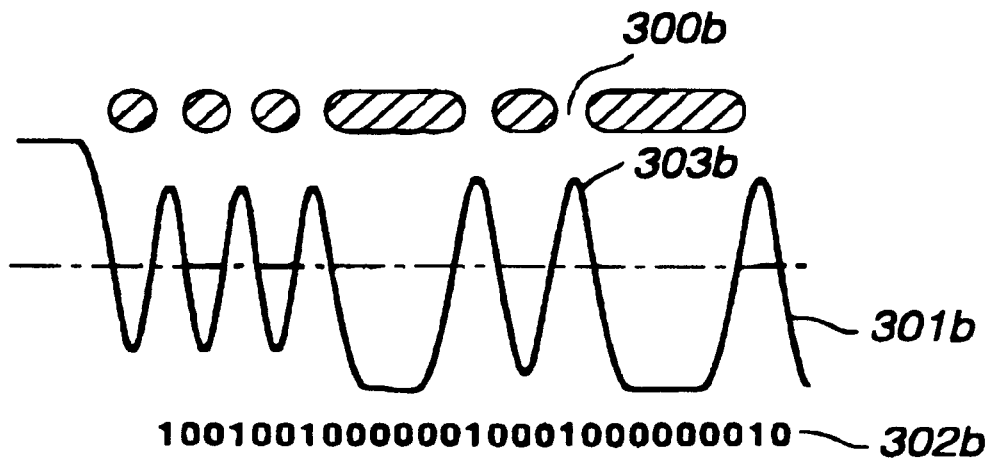

An explanation is hereinafter given about an example of the relationship between a recording modulation mode of the prepits 102 and 103 and a playback signal by using FIG. 3.

In the header area over the land track 106, a pattern of prepits is formed in a pitposition mode by keeping information at the positions of prepits as in a prepit 300a. When the prepit 300a is played back, a header playback signal 301a is subjected to optical modulation, thereby becoming a low level as in point 303a and forming a minimum point. In a playback process of the pit position method, the position of the minimum point as in point 302a is detected by using a differentiator, thereby obtaining a binary digit string 302a of 0 and 1.

On the other hand, in the header area over the groove track 105, a pattern of prepits is formed in a space position mode by keeping information at positions of spaces like a space 300b between prepits. When the space 300b is played back, a header playback signal 301b becomes a high level as in point 303b and forms a maximum point because it is not subjected to modulation. In a playback process of the space position mode, the position of the maximum point as in point 302b is detected by using a differentiator or the like, thereby obtaining a binary digit string 302b or 0 or 1.

The prepit array pattern in the header area is a recording modulation mode, called 2–7 modulation, in which sector address information is converted into a consecutive binary digit string of 0 and 1, which is appropriate for recording. In this recording modulation mode, bit 1 is always inconsecutive and always appears before and after bit 1, and bit 0 always appears consecutively, in numbers from 2 to 7. Bit 1 corresponds to a prepit in the pitposition mode while bit 1 corresponds to a space in the space position mode.

Land tracks and groove tracks are placed alternately every round, and prepit sequence in the pit position mode and prepit sequence in the space position mode are arranged alternately in a radial direction. Accordingly, the total length of prepits within a single sector over the land track becomes shorter than that over the adjacent groove track.

Consequently, in relation to frequency bands of the tracking servo, arrays of pits 102 over the groove tracks 105 in the header area are considered as consecutive grooves, and arrays of pits 103 over the land tracks 106 in the header area are considered as consecutive lands. Therefore, when the tracking servo is applied to the respective tracks, stable tracking servo is possible because tracking error signals will not be reversed in the header area and the recording area within the same track.

A header playback signal is obtained with a sum signal of the respective two-piece sensors 210 and 211, so changes in the luminous intensity distribution of a beam incident upon the two-piece sensor 210 and 211 due to a disc tilt or a track offset do not give much influence on the read rate of the header playback signal. Therefore, it is possible to secure a wide margin for the disc tilt or track offset.

In this embodiment, 2–7 modulation is employed as a method for recording prepits in the header area. However, if a sum of prepit length within a single sector over the land track is shorter than that over the adjacent groove track, the recording modulation mode is not limited to the above-mentioned 2–7 modulation. Also the recording modulation mode in the recording area of the land tracks and the groove tracks is not limited to the above-mentioned mode.

Embodiment 2

Figure 2:
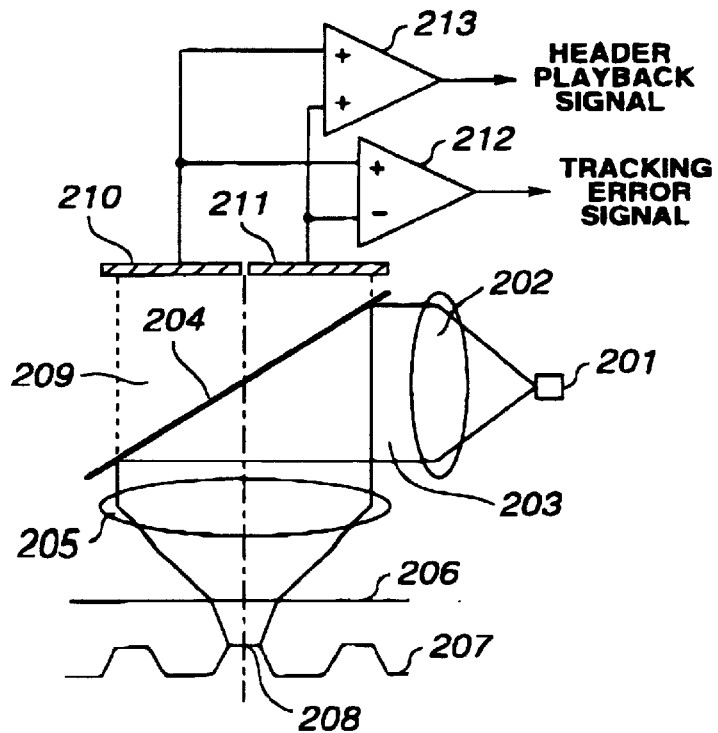
FIG. 2 is a view to explain the operation of playing the optical disc of Embodiment 1 or 2 on an optical disc drive.
Figure 4:
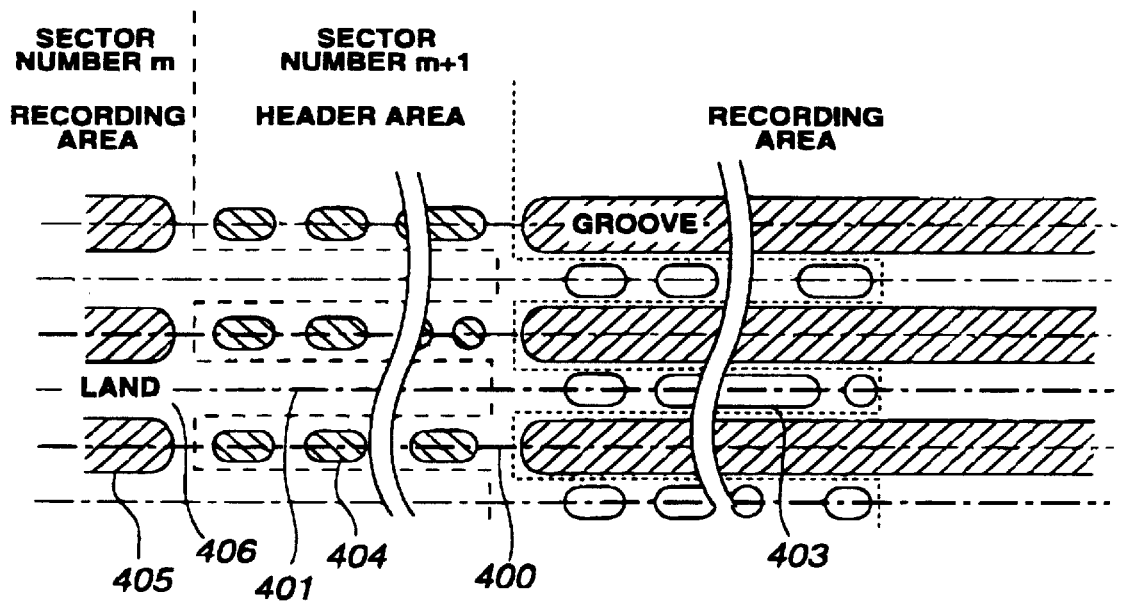
FIG. 4 is a view to explain the header area of the optical disc of Embodiment 2.
Figure 5:
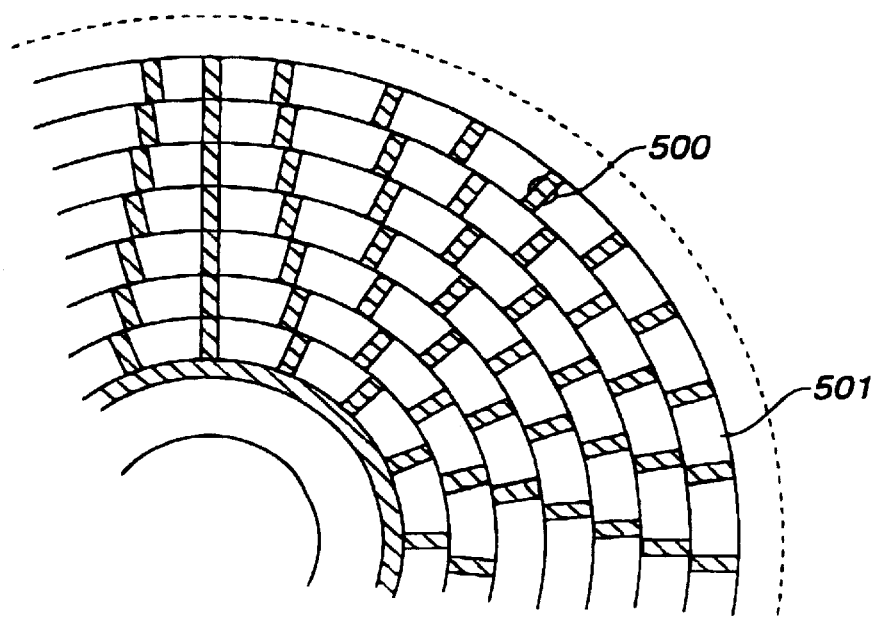
FIG. 5 is a view to explain the track layout of a conventional optical disc.
Figure 6:
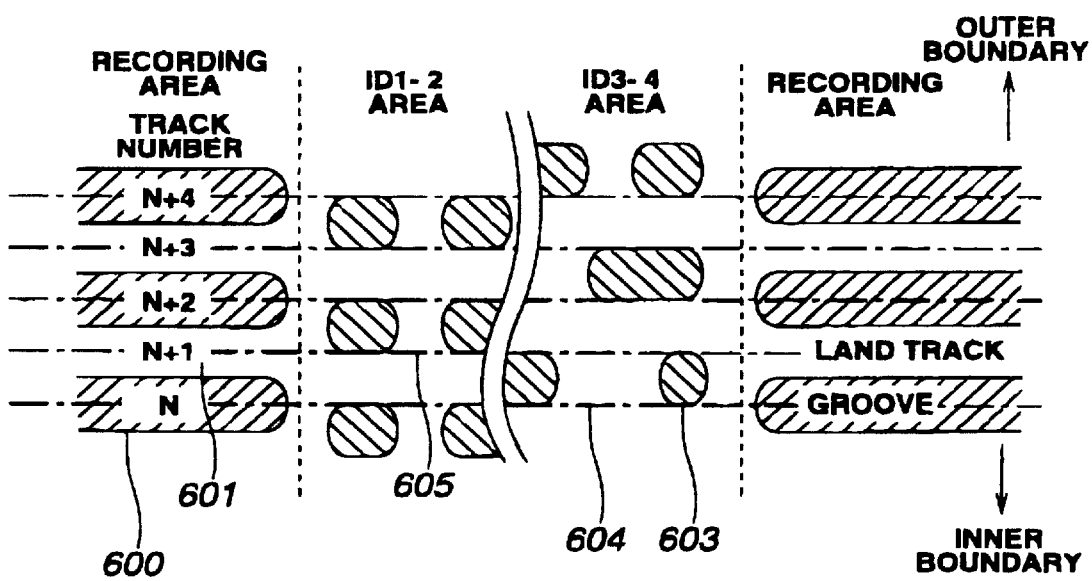
FIG. 6 is a view to explain the header area of the conventional optical disc.
Figure 7:
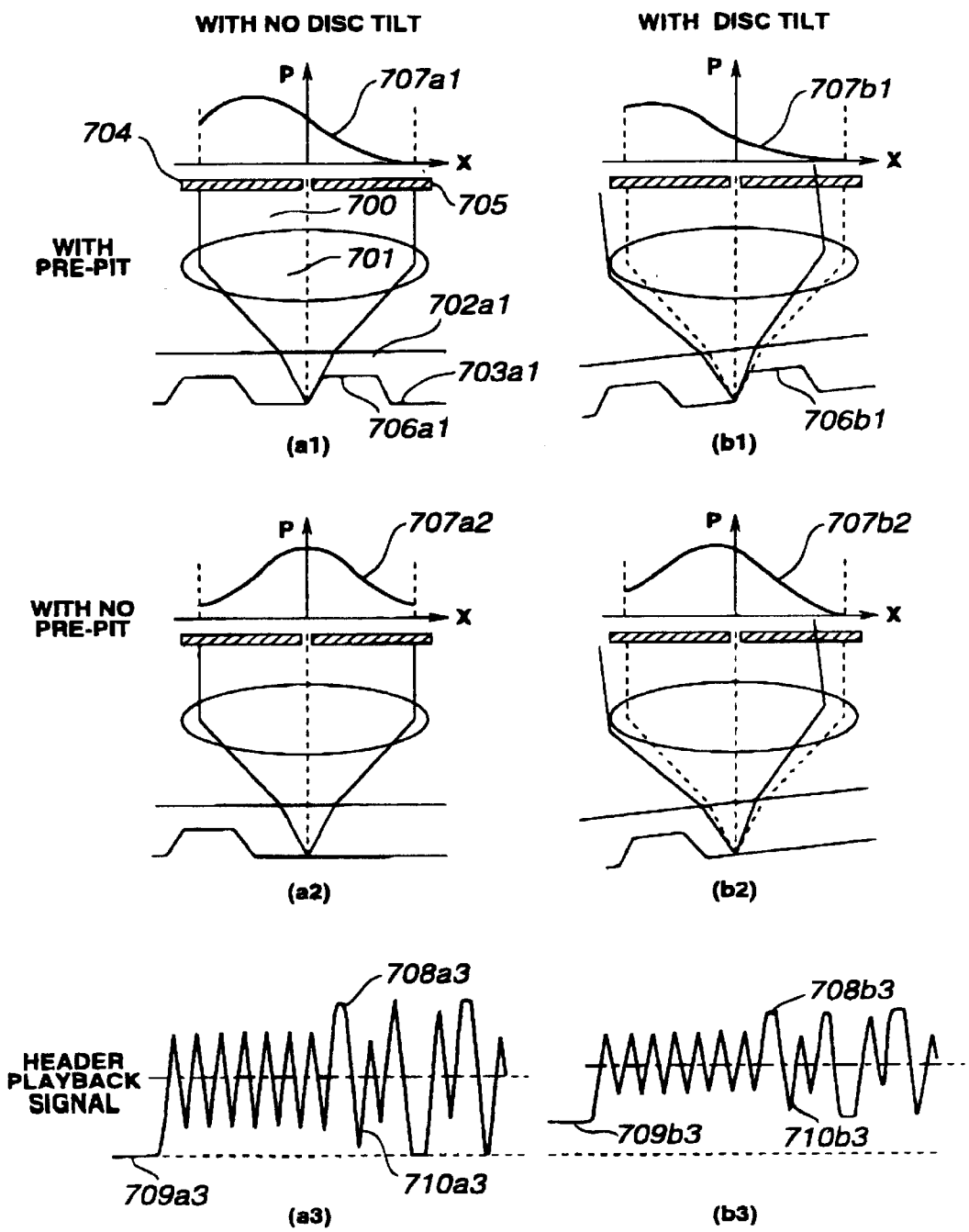
FIG. 7 is a view to explain the relationship between a disc tilt and a header playback signal.

Another embodiment of the optical disc of this invention is explained by using FIGS. 2, 4, 5.

Bands and a track layout on the recording side of the optical disc of this embodiment are the same as those of the optical disc of Embodiment 1 as shown in FIG. 5. An enlarged view of a header area 500 is shown in FIG. 4. Each sector is structured of a header area which is composed of arrays of prepits 403 and 404 representing synchronizing signals and sector address information, and a recording area for users to use for recording/playback. A sector of a groove track 400, however, is deviated from a sector of an adjacent land track 401 in a peripheral direction by the length of the header area. Both land tracks and groove tracks can record/playback in the recording area.

A playback mode in the header area of an optical disc drive and a tracking error signal detection mode are the same as those of an optical disc of Embodiment 1.

An arrangement pattern of prepits 403 and 404 in the header area is a recording modulation mode called 1–7 modulation, and address information of a sector is converted into a consecutive binary digit string of 0 and 1. In this recording modulation mode, bit 1 is always inconsecutive and bit 0 always appears before and after bit 1, and bit 0 always appears consecutively in numbers from 1 to 7. When a prepit is formed, bit 1 means a change in the state. Specifically speaking, if the previous bit indicates the state of a prepit, the state changes to a space. If the previous bit indicates the state of a space, the state changes to a prepit. In the case of bit 0, the state of the previous bit continues.

Concerning frequency bands of a tracking servo, arrays of prepits 404 over groove tracks 400 are considered as consecutive grooves, and the polarity of tracking error signals of the header area does not change as compared with a recording area 405. Moreover, with regard to land tracks 401, the porarity of tracking error signals does not change, as compared with a recording area 401, because of the adjacent grooves on both sides in the header area. Therefore, when a tracking servo is applied to the respective tracks, a stable tracking servo is possible, because the tracking error signals will not be reversed in the header area and the recording area within the same track.

Since a header playback signal can be obtained from a sum signal of the respective two-piece sensors 210 and 211, changes in the luminous intensity distribution of a beam incident upon the two-piece sensors 210 and 211 due to a disc tilt or a track offset do not have much influence on the reading rate of the header playback signals. Therefore, it is possible to secure a wide margin for the disc tilt or track offset.

In this embodiment, 1–7 modulation is employed as the recording modulation mode of the prepits 403 and 404 in the header area. However, without limitation to such modulation, 2–7 modulation, EFM modulation or 8–16 modulation can also be considered.

INDUSTRIAL APPLICABILITY

When the optical disc of the present invention is recorded/played back in an optical disc drive, it is possible to obtain on both the land tracks and the groove tracks in the header area and the recording area, tracking error signals with the tracking servo polarity which does not change as compared with the recording area, thereby enabling stable tracking servo, and enhancing the reliability of playback of the optical disc.

Moreover, because a header playback signal can be obtained as a sum signal of the respective two-piece sensors, changes in the luminous intensity distribution of a beam incident upon the two-piece sensors due to a disc tilt or a track offset do not have much influence on the reading rate of the header playback signal. Therefore, it is possible to secure a wide margin for the disc tilt or track offset.

What is claimed is:

1. An optical disc with substantially ring-shaped groove tracks and land tracks disposed alternately on a recording side thereof, said optical disc is capable of rewriting information to both of these tracks, characterized in that prepits are always disposed on the center lines of the groove tracks or land tracks, and the total length of the prepits on the groove tracks within a single sector is always longer than that on the land tracks.

2. The optical disc according to claim 1, characterized in that a sector of said groove track is diviated from a sector of said land track by the length of a header area.

3. The optical disc according to claim 1, characterized in that the prepits on the groove tracks are recorded in space position modulation, and the prepits on the land tracks are recorded in pit position modulation.

4. The optical disc according to claim 3, characterized in that the prepit data modulation mode is 2–7 modulation.

* * * * *